United States Patent Office 3,104,236
Patented Sept. 17, 1963

3,104,236
COATING COMPOSITION COMPRISING A POLYVINYL ACETAL, A PHENOL-ALDEHYDE RESIN, A MELAMINE-ALDEHYDE RESIN AND A POLYURETHANE, AND ELECTRICAL CONDUCTOR COATED THEREWITH
Edward Lavin, Longmeadow, Albert H. Markhart, Wilbraham, and Robert E. Kass, Springfield, Mass., assignors to Shawinigan Resins Corporation, Springfield, Mass., a corporation of Massachusetts
No Drawing. Filed Feb. 1, 1960, Serial No. 5,664
15 Claims. (Cl. 260—45.1)

This invention relates to polyvinyl acetal coating compositions. More particularly, this invention relates to coating composition comprising polyvinyl acetals reacted with certain polyurethanes, phenolic resins and melamine resins and to the use of such compositions as electrical insulation.

Polyvinyl acetals modified with phenolic resins are well known, being used extensively as coatings in various applications such as can linings and as electrical insulation. They are also used as structural adhesives, particularly as taught by De Bruyne in U.S. Patent 2,499,134. A delicate balance in many varied properties is required for these applications and much work has been done to improve the characteristics desired since the formulations were first shown by Jackson and Hall in U.S. Patent 2,307,588.

Some recent work is disclosed by Daszewski in U.S. Patent 2,730,466, Emig et al. in U.S. Patent 2,668,157, and Anderson in U.S. Patent 2,574,313. Most of the new compositions have included extremely minor amounts of various additives to improve the preferred commercial compositions comprising generally 100 parts of polyvinyl acetal and 50 parts of phenolic resin.

The polyvinyl acetals have also been reacted with certain polyurethanes, such as taught in Australian Patent 206,454, issued February 20, 1957, and as is disclosed in an application of Edward Lavin and Albert H. Markhart, Serial Number 823,373, filed June 29, 1959, now Patent No. 3,068,189. The latter compositions comprise 100 parts polyvinyl acetal, 20–200 parts of a polyurethane, 1–30 parts of a phenol-aldehyde resin and 0.5–20 parts of a melamine resin. Said compositions can best be characterized in that the cured coatings therefrom have improved resistance to various organic solvents, particularly monochlorodifluoromethane and improved stability as measured by abrasive resistance, flexibility and dielectric strength.

Although the modified polyvinyl acetal compositions referred to above are commercial acceptable as electrical insulation for general purposes, the solvent resistance of the cured composition in contact with certain other widely used liquid halogenated hydrocarbons is not satisfactory. More specifically, the above cured compositions swell unduly in contact with the chlorinated biphenyls, also known commercially as "askarels," and used in transformers. The applicants have found, surprisingly, that by increasing the ratios of the phenol-aldehyde resin to the other components in said compositions, that a novel synergistic effect is produced, whereby the askarel resistance is improved without materially altering the other desirable properties of the compositions.

An object of this invention is to provide crosslinked polyvinyl acetal compositions with improved resistance to various organic solvents, particularly monochlorodifluoromethane and the chlorinated biphenyls.

A particular object of this invention is to provide improved wire enamels for use as electrical insulation.

These and other objects are obtained with coating compositions comprising 100 parts polyvinyl acetal, 20–200 parts of a polyurethane, 0.5–20 parts of a melamine resin and 30–150 parts of a phenol-aldehyde resin.

This invention is illustrated in its preferred embodiment in the following examples and subsequent discussions thereon, but is not limited thereto. Where parts and percentages are shown hereinafter in the specification and in the claims, they are parts and percentages by weight unless otherwise specified.

EXAMPLE 1

A polyvinyl formal resin was used having the following analysis:

|   | Percent |
|---|---|
| Acetate groups calculated as polyvinyl acetate | 10½ |
| Hydroxyl groups calculated as polyvinyl alcohol | 6 |
| Formal group calculated as polyvinyl formal "by difference" | 83½ |

100 parts of this resin together with 60 parts of a polyurethane represented by the formula:

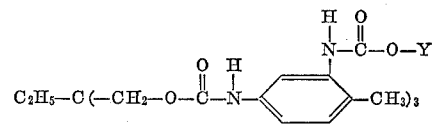

where Y is a phenyl group, along with 35 parts of a phenolaldehyde resin, added as a 50% solution in cresylic acid, and 5 parts of a melamine-formaldehyde condensate resin, added as a 67% solution of xylene were added to a solvent mixture comprising 440 parts of naphtha and 255 parts of cresylic acid. The resin additions were made in a suitable container at room temperature with moderate agitation. An ambered colored solution was obtained having a total solids of approximately 21.5% and a viscosity of 5500 cps. at 25° C.

Six coats of this enamel were applied to No. 18 magnet wire by running the wire through the solution by conventional means. After each coating, the wire was passed through a vertical oven 12 feet high at a speed of approximately 14 feet per minute, the hottest portion of the oven being approximately 4 feet long and having a temperature of about 350° C. The increase in thickness of the wire due to the insulative coating was approximately 3 mils total build. Control samples were also prepared for comparison of an insulative composition comprising the same resinous materials hereinbefore employed but employing lower ratios of the phenol-aldehyde resin to the other constituents of the composition. The results of tests for askarel swelling for the compositions are shown in Table I below.

Table I

| Composition | Parts Polyvinyl formal | Parts Polyurethane | Parts Melamine-aldehyde | Parts Phenol-aldehyde | Percent Askarel Swelling |
|---|---|---|---|---|---|
| Ex. 1 | 100 | 60 | 5 | 35 | 15 |
| Control 1 | 100 | 60 | 5 | 5 | 41 |
| Control 2 | 100 | 60 | 5 | 15 | 29 |

It will be noted from the above results that the composition of Example 1 had vastly improved askarel resistance compared to both control samples.

The percentage askarel swelling is determined by the difference in thickness between the original cured coating and the coating after exposure to a liquid askarel at 125° C. for 16 hours.

The particular askarel employed for this test is a commerically available product and comprises a blend of 45% by weight of hexachlorobiphenyl and 55% by weight of a mixture of tri- and tetrachlorobenzenes. The thickness of the coating is determined by difference between the bare wire diameter and the diameters of the cured coated wire before and after swelling. The percent swelling is calculated as follows:

Percent swell $$= \frac{\text{Swollen thickness} - \text{unswollen thickness}}{\text{Unswollen thickness}} \times 100$$

EXAMPLES 2–5

To illustrate the desirable synergistic effects produced in the present compositions by variation of the phenol-aldehyde resin and melamine resin components within the proportions of the invention, the following results are reported in tabular form below:

Table II

| Composition | Parts Polyvinyl formal | Parts Polyurethane | Parts Melaminealdehyde | Parts Phenolaldehyde | Percent Askarel Swelling | Flexibility |
|---|---|---|---|---|---|---|
| Ex. 1 | 100 | 60 | 5 | 35 | 15 | 1 |
| Ex. 2 | 100 | 60 | 5 | 75 | 10 | 2 |
| Ex. 3 | 100 | 60 | 0 | 35 | 41 | 2 |
| Ex. 4 | 100 | 60 | 0 | 50 | 38 | 3 |
| Ex. 5 | 100 | 60 | 15 | 0 | 46 | 1 |

It will be noted from the above results that when either the melamine-aldehyde resin or phenol-aldehyde resin is absent from the composition that the swelling of the cured composition in the presence of the askarel is increased. It will also be noted from the above results that the melamine-aldehyde component improves flexibility.

EXAMPLES 6–8

To further illustrate the improved properties of electrical insulation obtained from the present compositions as well as to illustrate the preferred compositions, the results of tests on cured coated wire are as follows:

Table III

| Parts | Ex. 6 | Ex. 7 | Ex. 1 |
|---|---|---|---|
| Polyvinyl formal | 100 | 100 | 100 |
| Polyurethane | 45 | 50 | 60 |
| Phenol-aldehyde | 40 | 45 | 35 |
| Melamine-aldehyde | 7.5 | 5 | 5 |
| Build (mils) | 3.0 | 3.1 | 3.0 |
| Flexibility | 1 | 2 | 1 |
| Jerk test | P | P | P |
| Toluene-alcohol boil | P | P | P |
| Abrasion strokes | 127 | 138 | 175 |
| Percent Askarel swelling | 14 | 13 | 15 |
| Cut-through temp. (° C.) | 290 | 285 | 300 |
| Toluene-MeOH extractibles (percent) | 0.2 | 0.1 | 0.7 |
| Monochlorodifluoromethane extractibles (percent) | 0.7 | 0.1 | 0.6 |
| Dry dielectric (volts/mil) | 3,350 | 3,010 | 2,590 |
| Wet dielectric (volts/mil) | 2,850 | 2,470 | 2,545 |
| Heat shock (160° C.) | 1 dia. | 1 dia. | 1 dia. |

*Build.*—The addition to the diameter of the bare wire, in thousandths of an inch, was measured by means of a micrometer caliper.

*Jerk test.*—This test is a measure of the adherence and flexibility of the cured film to the metal wire and is made in accordance with A.S.A. specifications, whereby a sample of the cured coated wire is elongated to failure of the wire at a wire travel rate of 12–16 feet per second. The sample passes the test if no cracks or loss of adherence appears in the coating more than 1/8 inch from the break after the test.

*Toluene-alcohol boil.*—A test for solvent resistance made in accordance with modified A.S.A. procedure, which subjects a coated wire to mechanical stress to measure the removability of the coating after a ten minute immersion in an equivolume boiling solution of ethanol and toluene.

*Abrasion.*—The A.S.A. abrasion resistance test is performed by scraping the coating of a No. 18 heavy build (under a 700 gram load) on a standard machine tester until contact is made with the metal wire substrate.

*Cut-through temperature.*—The cut-through temperature is a test for thermoplastic flow of the coating, whereby crossed, coated wires are mechanically loaded while the ambient temperature is raised until electrical contact is made between the metallic substrates of the wires. The temperature at failure is reported.

*Toluene-methanol extractibles.*—Weighed specimens are immersed successively in boiling reagent grade toluene and reagent grade methanol for a period of two hours immersion in each solvent. The samples are then dried and re-weighed, whereupon the amount of coating which has been extracted during the successive immersions is calculated and reported on a percentage loss basis.

*Monochlorodifluoromethane extractibles.* — Weighed specimens were immersed in the liquid refrigerant for a period of 16 hours. The immersion was conducted in a bomb in order to keep the normally gaseous refrigerant in a liquid state, and the test conditions for the bomb were 205–240 p.s.i. and 37–43° C. The test specimens were removed after the immersion period, dried and re-weighed. The amount of extractibles obtained from the coating were calculated on a percentage weight loss basis.

*Heat shock.*—Heat shock is a measure of the cracking of a stressed wire coating when heated to the 160° C. temperature indicated. Coated wire is first wound about mandrels of one, two and three times the diameter of the coated wire, then heated in a mechanical-convection oven for one hour at the indicated temperature. The specimens are thereafter examined for cracks and the smallest mandrel over which no cracks in the coating have developed is reported.

*Dielectric.*—The dielectric strength the coating was measured by an A.S.A. procedure whereby the voltage at which the breakdown between the coatings on a pair of twisted coated wires occurred is reported on the basis of a per unit thickness of the coating.

*Flexibility.*—The flexibility of the coatings was measured by a modified A.S.A. (American Standard Association) procedure whereby the coated wire is first stretched approximately 25% in length then wrapped around circular mandrels of the same diameter as the wire or multiple diameters thereof. The smallest diameter mandrel about which the coated wire can be lapped for ten turns without visible cracks or ruptures is reported. For example, a report of one signifies that the sample will pass on a mandrel of the same diameter as the wire being tested, while the report of two signifies that the coating may not be wrapped around a mandrel smaller than twice the diameter of the wire without failure within ten turns.

EXAMPLE 8–12

To still further illustrate the practice of the present invention with other types of the general class of resinous materials used in the preceding examples, Examples 8–12 are given, wherein various polyvinyl acetals, polyurethanes, phenol-aldehydes and melamine-aldehyde resins are substituted in the compositions for the materials employed heretofore. The compositions are illustrated in tabular form below:

Table IV

| | Examples | | | | |
|---|---|---|---|---|---|
| | 8 | 9 | 10 | 11 | 12 |
| Polyvinyl formal of Ex. 1 | | | | 100 | |
| Polyvinyl formal "A" | 100 | 100 | 100 | | |
| Polyvinyl butyral | | | | | 100 |
| Polyurethane of Ex. 1 | 40 | | | 60 | 60 |
| Polyurethane "A" | | 40 | 40 | | |
| Phenol-aldehyde of Ex. 1 | | | 30 | 30 | 35 |
| Phenol-aldehyde "A" | 40 | 40 | | | |
| Melamine-aldehyde of Ex. 1 | 5 | 5 | 5 | | 5 |
| Melamine-aldehyde "A" | | | | 5 | |
| Percent askarel swelling | 16 | 12 | | | 19 |

The polyvinyl formal "A" resin differs from the polyvinyl-formal in Ex. 1, and having been stabilized with an alkali metal hydroxide rather than ammonia.

The polyvinyl butyral disclosed had the following analysis: 2% acetate groups (calculated as polyvinyl acetate), 12% hydroxyl groups (calculated as polyvinyl alcohol), and 88% acetal groups (calculated by difference as polyvinyl butyral).

Polyurethane "A" is the phenolic adduct of the trimer of tolylene diisocyanate.

Phenol-aldehyde "A" is a commercially available silane modified phenol-aldehyde laminating varnish. It was added to the enamel composition as a 60-64% by weight solution in isopropanol.

The melamine-aldehyde resin of Example 1 was a relatively low molecular weight butylated internally plasticized condensation product of one mol melamine, with 3½ mols formaldehyde and 0.5 mol paratoluene sulfonamide.

The melamine-aldehyde "A" resin was the co-condensation product of melamine, formaldehyde and butanol.

The resinous compositions of this invention are the heat cured solid reaction products of 100 parts by weight of a polyvinyl acetal, 20–200 parts of a polyurethane, 30–150 parts of a phenol-aldehyde resin and 0.5–20 parts of a melamine-aldehyde resin. For the best balance of properties required for insulative wire coating compositions, it is preferred to react 100 parts of a polyvinyl formal with 30–80 parts of the polyurethane, 30–75 parts of the phenol-aldehyde resin and 3–10 parts of a melamine-formaldehyde condensate resin.

The polyurethane materials of this invention are adducts of organic polyisocyanates having the isocyanate group reacted with the reactive hydrogen of another organic compound. The adduct portion of the polyurethane is removed by the elevated temperatures of the cure reaction, permitting the remaining polyisocyanate to crosslink the resinous composition. Suitable polyisocyanates include compounds, such as phenylene diisocyanates, diphenylene diisocyanates, tolylene diisocyanates, naphthylene diisocyanates, diphenylmethane diisocyanates, cyclohexane diisocyanates, ethylene diisocyanates, tetramethylene diisocyanates, hexamethylene diisocyanates, polyaryl polyisocyanates, trimers of polyisocyanates, polyisocyanates which are the reaction products of diisocyanates or triisocyanates with polyhydric alcohols and the like, and mixtures, trimers and isomers thereof.

The simplest class of useful polyisocyanates can be represented by the following general formula:

$$R(-N=C=O)_n$$

where R represents a radical of appropriate valence derived from a member of the class consisting of aliphatic hydrocarbons containing up to 8 carbon atoms, aromatic hydrocarbons containing up to 13 carbon atoms, alicyclic hydrocarbons containing up to 6 carbon atoms, and alkylaryl substitutes thereof, and $n$ is an integer from 2-4. Typical trimers of the useful polyisocyanates can be illustrated by the following general formula:

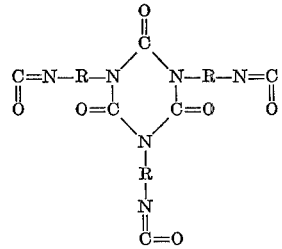

where R is the same as defined in the above formula for the polyisocyanates. Typical examples of the reaction products are polyisocyanates with polyhydric alcohols and can be illustrated by the following general formula:

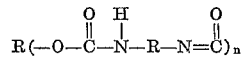

where R is the same as defined in the above formula for the polyisocyanates and $n$ is an integer from 2-10.

Suitable reactive hydrogen containing compounds combining with the polyisocyanates to form the desired polyurethanes include phenols such as phenol, cresol, xylenols, etc., secondary aromatic amines, alcohols (mono- and -polyfunctional), amides, lactams, mercaptans, enols and the like. Mixtures thereof can also be used to block the isocyanates. The preferred blocking agents are compounds with the hydroxyl group attached to the aromatic ring.

The preferred polyurethanes may be prepared by reacting the monohydric phenol with the reaction product of a polyhydric alcohol and an arylene diisocyanate. The polyhydric alcohols are in general preferably limited to compounds containing not more than 16 carbon atoms. For use in wire enamels, the polyhydric alcohols should contain preferably not more than 10 carbon atoms. Examples of these alcohols are, ethylene glycol, propylene glycol, glycerol, trimethylol propane, pentaerythritol, one of the isomeric hexane triols, etc. The monohydric phenol may be an aryl compound such as phenol, cresols, xylenols and ethyl phenol. This class of preferred polyurethanes can be represented by the general formula:

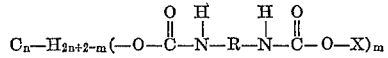

where R represents a member of the class consisting of phenylene, methyl phenylene, dimethyl phenylene, naphthylene and methyl naphthylene groups, X represents a member of the class consisting of phenyl and alkyl phenyl groups, said alkyl groups containing 1–6 carbon atoms, $m$ is an integer greater than 1 but not greater than $n$, and $n$ is an integer from 2–10.

The polyvinyl acetals useful in this invention are obtained by reacting polyvinyl alcohols or a partially hydrolyzed polyvinyl ester with an aldehyde, especially formaldehyde. Polyvinyl acetals contain a certain number of hydroxyl groups and may contain a certain number of ester groups depending upon the extent of the hydrolysis and the acetalation reactions. The preferred polyvinyl formal resins contain on a weight basis, 1–35% ester groups calculated as polyvinyl ester, 3–15% hydroxyl groups calculated as polyvinyl alcohol and the balance substantially formaldehyde acetal. In the commercial polyvinyl formals, the ester groups are acetate groups. Other polyvinyl acetals such as the reaction product of hydrolyzed polyvinyl esters with acetaldehyde, propionaldehyde, butyraldehyde and benzaldehyde may also be reacted with the polyurethane of this invention.

The melamine-aldehyde resins which can be used in the present wire enamel compositions can be selected from the general class of resinous aldehyde condensation products of melamine which are soluble in the organic liquids employed as solvents for the resinous components of the enamel.

The useful melamine compounds include such derivatives of melamine as melam and melem. The aldehyde condensation products are well known and may be formed by reacting from 1–6 mols of the aldehyde with 1 mol of melamine. The solubility of the melamine-aldehyde condensation product is generally obtained by further reacting the condensation product with an alcohol or by co-condensing the melamine and aldehyde in the presence of an alcohol.

The aldehydes which may be used are aliphatic, aromatic, cyclic and heterocyclic aldehydes, including formaldehyde, acetaldehyde, propionaldehyde, butyraldehyde, isobutyraldehyde, valeraldehyde, octaldehyde, benzaldehyde, cinnamaldehyde, cyclohexanone, furfural, etc.

The alcohols which may be used include aliphatic, cyclo aliphatic, aromatic, nitro, and amino alcohols such as methanol, ethanol, proponal, isoproponal, butanol, isobutanol, pentanols, octanols, lauryl alcohol, cetyl alcohol, stearyl alcohol, cyclohexanol, benzyl alcohol, cinnamyl alcohol, allyl alcohol, 2-nitro-1-butanol, 2-nitro-2-methyl-1-proponal, 2-nitro-2-methyl - 1,3-propane diol, 2-nitro-2-ethyl-1,3-propane diol, tris (hydroxy methyl) nitro methane, 2-amino-1-butanol, 2-amino-2-methyl-1-proponal, 2-amino-2-methyl-1,3-propane diol, 2-amino-2-ethyl-1,3-propane diol, tris (hydroxy methyl) amino methane etc. Mixtures of two or more alcohols may be used if desired. The amounts of the alcohol reacted are generally equal to or in excess of the formaldehyde on a molar ratio.

The preferred melamine-aldehyde resins are the further reaction products of the melamine, aldehyde and alcohol reactants with an aryl sulfonamide.

These products are also well known and may be obtained by co-condensation of all the reactants named such as taught in U.S. Patent 2,508,875, which is hereby incorporated by reference. The useful aryl sulfonamides include benzene sulfonamide and the ring-substituted derivatives thereof such as toluene sulfonamide, chlorobenzene sulfonamide, nitrobenzene sulfonamides, etc.

For reasons of economy and availability, it is preferred to use the co-condensation products of melamine, toluene sulfonamide, formaldehyde and butanol. The proportions of reactants may be varied between the limits of 1 mol of melamine to from 0.1 to 1.0 mol of toluenesulfonamide and from 1–6 or more mols of formaldehyde. An excess of the formaldehyde may be used. The toluenesulfonamides may be any of the isomeric ortho, meta or para-derivatives or it may be a mixture of two or more of the isomers.

The phenol-aldehyde resins which are useful in the present invention can be limited to those soluble in the solvent systems employed for the preparation of wire enamels. Such can be readily selected from the general class of heat curable phenol-aldehyde resins. The phenolic portion of the resin, in addition to the meta-para-cresol used in most of the above examples, may also be selected from the group consisting of phenols, xylenols, mixtures of xylenols and cresols, and wood-oil phenolic bodies, petroalkyl phenols, coal-tar phenol and others. The aldehyde portion of the resin in addition to the formaldehyde used in the examples may also be paraformaldehyde, acetaldehyde or other suitable aldehydes. The preferred composition of phenol-aldehyde resin useful for wire enamels is obtained by reacting 1 mol of the phenolic compound selected from the group consisting of meta-para-cresol and para-tertiary butyl phenol with 0.1–2.0 mols of formaldehyde.

To be used as a coating composition, the polyvinyl acetals, polyurethane, phenol-aldehyde resins, and melamine-aldehyde condensate resins should be dissolved in a substantially anhydrous organic solvent medium. Any non-reactive volatile mutual solvent for the resinous components may be used, such as ethylene dichloride, trichloroethylene or mixed solvent systems of alcohols, esters and hydrocarbons. For the coating of magnet wire, the solvent medium preferably contains a substantial amount of a phenol such as phenol, cresol, xylenol, and an aliphatic or aromatic hydrocarbon such as xylene, naphtha and mixtures such as the high solvency petroleum hydrocarbons used in the examples. The particular naphtha hydrocarbon mixture in the preceding example for the preparation of the wire enamels is a mixture of aromatic liquid hydrocarbons of boiling range 150–184° C. derived from coal-tar and/or petroleum. The cresylic acid that was used is a mixture of liquid phenolic compounds consisting primarily of xylenols and cresols and having a boiling range of 195–227° C.

The wire enamels of the present invention are stable indefinitely under usual storage conditions. Further, no initiator other than heat is required to accomplish the reactions of the resins. The reaction initiates at temperatures about 150° C. with the reaction proceeding more rapidly as the temperatures increase. In the commercial type wire towers generally employed for wire enameling, it is preferred to conduct the reaction at tower operating temperatures of approximately 300–450° C.

The resinous compositions of this invention form valuable insulative coatings both on magnet wires and in other applications such as for example, foil condensers. These coatings are smooth, glossy, tough, adhere well to metals, are resistant to solvents and abrasion, and are superior to conventional wire enamels in hermetic and askarel filled transformer applications.

It is to be understood that the present invention is not limited to the particular wire coating compositions, applications or wire sizes described above. It is obvious from the above test results that it is possible to utilize the present coating compositions as a base coat on a wire and to apply as an overcoat one or more of the many compatible insulating varnishes and thereby obtain a coating acceptable at even higher operating temperatures. It is also obvious that the present enamels may be applied as a varnish over a base coat of less thermally resistant and solvent resistant coatings. Nor is it intended to limit the application of the resinous composition as an electrical insulation for wire merely. The solid resinous constituents of the present invention are indefinitely stable as a dry mixture at room temperature. It is possible therefore by means of extrusion, dipping, casting and other known means to form insulation from such a mixture that is useful in such electrical applications as slot liners, encapsulation, sheet insulation, and surface coatings. The coating compositions disclosed can also be used as an adhesive or impregnating varnish for such articles as glass tapes and electrical coils. Other non-electrical uses of the compositions are apparent where chemical resistance and temperature stability of the final product are needed, such as surface coatings and others. It will be obvious to the man skilled in the art, therefore, that other compositions and applications are within the scope of this invention.

What is claimed is:

1. A coating composition comprising an organic liquid solution of 100 parts of a polyvinyl acetal, 35–150 parts of a phenol-aldehyde resin, 0.5–20 parts of a melamine-aldehyde condensate resin and 20–200 parts of a polyurethane, which polyurethane consisting of the adduct of an organic polyisocyanate with a reactive hydrogen containing compound, said compound containing up to 13 carbon atoms.

2. A coating composition as in claim 1 wherein the polyvinyl acetal is polyvinyl formal.

3. A coating composition comprising an organic liquid solution of 100 parts of polyvinyl formal, 35–150 parts of a phenol-aldehyde resin, 0.5-20 parts of a melamine-aldehyde condensate resin and 20–100 parts of a polyurethane represented by the formula

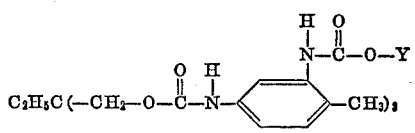

where Y is a member selected from the class consisting of phenyl, methyl phenyl and dimethyl phenyl groups.

4. A composition comprising the product of heating to at least 150° C. 100 parts of a polyvinyl acetal, 35–150 parts of a phenol-aldehyde resin, 0.5–20 parts of a melamine-aldehyde condensate resin and 20–200 parts of a polyurethane, which polyurethane consisting of the adduct of an organic polyisocyanate with the reactive hydrogen containing compound, said compound containing up to 13 carbon atoms.

5. A composition as in claim 4 wherein the polyvinyl acetal is polyvinyl formal.

6. A composition comprising the product of heating to at least 150° C. 100 parts of polyvinyl formal, 35–75 parts of a phenol-aldehyde resin, 3–10 parts of a melamine-formaldehyde condensate resin and 30–80 parts of a polyurethane, which polyurethane consisting of the adduct of an organic polyisocyanate with a reactive hydrogen containing compound, said compound containing up to 13 carbon atoms.

7. A composition comprising the reaction product of heating at temperatures over 150° C. an organic liquid solution containing 100 parts of polyvinyl formal, 3–10 parts of a melamine-formaldehyde condensate resin, 35–75 parts of a phenol-aldehyde resin and 30–80 parts of a polyurethane represented by the formula

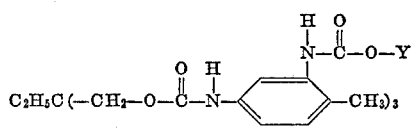

where Y is a member selected from the class consisting of phenyl, methyl phenyl and dimethyl phenyl groups.

8. A composition comprising a reaction product of heating at temperatures of at least 150° C. an organic liquid solution containing 100 parts of polyvinyl formal, 35 parts of a phenol-aldehyde resin, 5 parts of a melamine-formaldehyde condensate resin and 60 parts of a polyurethane represented by the formula

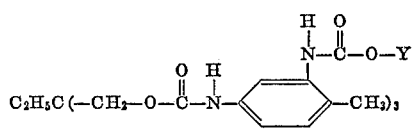

where Y is a member selected of the class consisting of phenyl, methyl phenyl and dimethyl phenyl groups.

9. A composition comprising a reaction product of heating at temperatures of at least 150° C. an organic liquid solution containing 100 parts of polyvinyl formal, 40 parts of a phenol-aldehyde resin, 7.5 parts of a melamine-formaldehyde condensate resin and 45 parts of a polyurethane represented by the formula

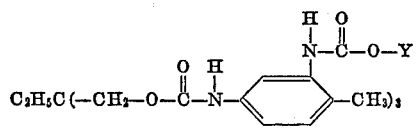

where Y is a number selected of the class consisting of phenyl, methyl phenyl and dimethyl phenyl groups.

10. A process for preparing a resinous composition which comprises heating at a temperature of at least 150° C. an organic liquid solution containing 100 parts of polyvinyl formal resin, 35–150 parts of a phenol-aldehyde resin, 0.5–20 parts of a melamine-aldehyde condensate resin and 20–200 parts of a polyurethane, which polyurethane consisting of the adduct of an organic polyisocyanate with a reactive hydrogen containing compound, said compound containing up to 13 carbon atoms.

11. A process for insulating wire which comprises coating the wire with an organic liquid solution comprising 100 parts of polyvinyl formal, 35–150 parts of a phenol-aldehyde resin, 0.5–20 parts of a melamine-aldehyde condensate resin and 20–200 parts of a polyurethane, which polyurethane consisting of the adduct of an organic polyisocyanate with the reactive hydrogen containing compound, said compound containing up to 13 carbon atoms, removing the solvent from the coating and curing the coating on the wire to a temperature of at least 150° C.

12. Electrical insulation comprising the product of heating at at least 150° C. 100 parts of polyvinyl formal, 35–150 parts of a phenol-aldehyde resin, 0.5–20 parts of a melamine-aldehyde condensate resin and 20–200 parts of a polyurethane, which polyurethane consisting of the adduct of an organic polyisocyanate with a reactive hydrogen containing compound, said compound containing up to 13 carbon atoms.

13. An electrical conductor insulated with an organic insulation comprising the product of heating at at least 150° C. 100 parts of a polyvinyl formal, 35–150 parts of a phenol-aldehyde resin, 0.5–20 parts of a melamine-aldehyde condensate resin and 20–200 parts of a polyurethane, which polyurethane consisting of the adduct of an organic polyisocyanate with a reactive hydrogen containing compound, said compound containing up to 13 carbon atoms.

14. A coated electrical conductor consisting of a bare metal wire and a coating comprising the product of heating at temperatures of at least 150° C. 100 parts of polyvinyl formal, 35–150 parts of a phenol-aldehyde resin, 0.5–20 parts of a melamine-aldehyde condensate resin and 20–200 parts of a polyurethane, which polyurethane consisting of the adduct of an organic polyisocyanate with a reactive hydrogen containing compound, said compound containing up to 13 carbon atoms.

15. An electrically insulating varnish comprising the composition of claim 1.

References Cited in the file of this patent

UNITED STATES PATENTS

| 2,409,548 | Debacher | Oct. 15, 1946 |
| 2,430,479 | Pratt et al. | Nov. 11, 1947 |
| 2,454,678 | Smith et al. | Nov. 23, 1948 |
| 2,730,466 | Daszewski | Jan. 10, 1956 |

FOREIGN PATENTS

| 206,454 | Australia | Feb. 20, 1957 |